US012600687B2

(12) United States Patent
Zhao et al.

(10) Patent No.: US 12,600,687 B2
(45) Date of Patent: Apr. 14, 2026

(54) MOSS-COVERED GREEN MANURE AND APPLICATION METHOD IN ASSISTING ECOLOGICAL REMEDIATION

(71) Applicants: JIUZHAIGOU NATIONAL NATURE RESERVE ADMINISTRATION, Sichuan (CN); CHENGDU INSTITUTE OF BIOLOGY, CHINESE ACADEMY OF SCIENCES, Sichuan (CN); SOUTHWEST UNIVERSITY OF SCIENCE AND TECHNOLOGY, Sichuan (CN); ABA TIBETAN AND QIANG AUTONOMOUS PREFECTURE ECOLOGICAL PROTECTION AND DEVELOPMENT RESEARCH INSTITUTE, Sichuan (CN)

(72) Inventors: Demeng Zhao, Sichuan (CN); Geng Sun, Sichuan (CN); Qunlong Chen, Sichuan (CN); Jie Du, Sichuan (CN); Yanbao Lei, Sichuan (CN); Peng Ren, Sichuan (CN); Ke Chen, Sichuan (CN); Yunlai Tang, Sichuan (CN); Hao Tang, Sichuan (CN); Min Xiao, Sichuan (CN); Ying Dai, Sichuan (CN)

(73) Assignees: JIUZHAIGOU NATIONAL NATURE RESERVE ADMINSTRATION, Jiuzhaigou County (CN); CHENGOU INSTITUTE OF BIOLOGY, CHINESE ACADEMY OF SCIENCES, Chengdu (CN); SOUTHWEST UNIVERSITY OF SCIENCE AND TECHNOLOGY, Mianyang (CN); ABA TIBETAN AND QIANG AUTONOMOUS PREFECTURE ECOLOGICAL PROTECTION AND DEVELOPMENT RESEARCH INSTITUTE, Wenchuan County (CN)

( * ) Notice: Subject to any disclaimer, the term of this patent is extended or adjusted under 35 U.S.C. 154(b) by 300 days.

(21) Appl. No.: 18/507,880

(22) Filed: Nov. 13, 2023

(65) Prior Publication Data

US 2024/0400470 A1      Dec. 5, 2024

(30) Foreign Application Priority Data

Jun. 2, 2023      (CN) .......................... 202310651623.4

(51) Int. Cl.
*A01P 21/00* (2006.01)
*A01C 3/00* (2006.01)
(Continued)

(52) U.S. Cl.
CPC .................. *C05G 3/60* (2020.02); *A01C 3/00* (2013.01); *A01C 21/005* (2013.01);
(Continued)

(58) Field of Classification Search
None
See application file for complete search history.

(56) References Cited

U.S. PATENT DOCUMENTS

| | | | | | |
|---|---|---|---|---|---|
| 2004/0228895 | A1* | 11/2004 | Tsror | ...................... | A01N 25/18 |
| | | | | | 424/405 |
| 2009/0120339 | A1* | 5/2009 | Detweiler | ............... | C05F 11/02 |
| | | | | | 514/769 |
| 2017/0283337 | A1* | 10/2017 | Gaunt | ...................... | C05D 9/00 |
| 2024/0373844 | A1* | 11/2024 | Qin | ........................ | A01N 43/12 |

* cited by examiner

*Primary Examiner* — Joshua J Michener
*Assistant Examiner* — Nicole Paige Maccrate

(57) ABSTRACT
The present disclosure discloses a moss-covered green manure and an application method in assisting ecological remediation. The moss-covered green manure includes the following parts by weight of raw materials: 30-38 parts of
(Continued)

plant fibers, 30-35 parts of moss, 5-8 parts of paclobutrazol, 5-7 parts of a growth regulator, 50-62 parts of humus soil and/or an oil cake, and 35-47 parts of electrolytic water. According to the moss-covered green manure and the application method in assisting ecological remediation provided by the present disclosure, bare soil is covered by arranging cooperative moss-covered green manure in a non-planting area of a remediation plant to ensure the beauty of the appearance. Meanwhile, the soil can also be improved by further utilizing the advantages of preserving moisture and fertility, improving the nitrogen fixing capacity of the soil and not competing with plants for fertilizer of the moss-covered green manure.

12 Claims, 3 Drawing Sheets

(51) Int. Cl.
    *A01C 21/00*         (2006.01)
    *A01N 43/653*     (2006.01)
    *A01P 3/00*         (2006.01)
    *C05F 11/02*       (2006.01)
    *C05G 3/60*         (2020.01)
    *A01G 25/02*      (2006.01)

(52) U.S. Cl.
    CPC .............. *A01N 43/653* (2013.01); *A01P 3/00* (2021.08); *A01P 21/00* (2021.08); *C05F 11/02* (2013.01); *A01G 25/02* (2013.01)

1

2

3

4

MOSS-COVERED GREEN MANURE AND APPLICATION METHOD IN ASSISTING ECOLOGICAL REMEDIATION

CROSS-REFERENCE TO RELATED APPLICATION

This application claims priority from the Chinese patent application 202310651623.4 filed Jun. 2, 2023, the content of which is incorporated herein in the entirety by reference.

TECHNICAL FIELD

The present disclosure relates to the field of ecological remediation. More specifically, the present disclosure relates to a moss-covered green manure used for improvement and fertilization of the soil in an ecological remediation process and an application method in assisting ecological remediation.

BACKGROUND

As chemical fertilizers are used as fertilizers in agricultural cultivation for a long time in China, the soil structure is obviously changed by long-term use of the chemical fertilizers, contents of nutrients in the soil are constantly decreased, and the use efficiency of the soil is constantly reduced, so that the planting efficiency of crops is also constantly reduced.

Meanwhile, as green manure has a soil conservation effect and can improve the microbial structure in the soil and improve the quality of planted crops, the application range of the green manure has been enlarged in recent years. However, the green manure can act only on shallow soil layers when direct planted in the soil, and requirements of areas with large sandstorms cannot be met by actual use effects of the green manure. Moreover, green manure planting areas have no economic benefits for a long time, and enlargement of the planting area of the green manure is also affected.

SUMMARY

An objective of the present disclosure is to solve at least the above problems and/or defects and to provide advantages at least described below.

In order to achieve objectives and other advantages of the present disclosure, a moss-covered green manure is provided. The moss-covered green manure includes the following parts by weight of raw materials: 30-38 parts of plant fibers, 30-35 parts of moss, 5-8 parts of paclobutrazol, 5-7 parts of a growth regulator, 50-62 parts of humus soil and/or an oil cake, and 35-47 parts of electrolytic water.

Preferably, the moss-covered green manure further includes the following parts by weight of functional raw materials: 10-15 parts of alfalfa and/or 20-23 parts of Avena nuda.

Preferably, the moss-covered green manure includes the following parts by weight of raw materials: 36 parts of plant fibers, 32 parts of moss, 7 parts of paclobutrazol, 6 parts of a growth regulator, 60 parts of humus soil and/or an oil cake, and 38 parts of electrolytic water;

and the following parts by weight of functional raw materials: 13 parts of alfalfa and/or 22 parts of Avena nuda.

An application method of moss-covered green manure includes:

step 1: selecting a moss species and a moss-algae symbiont suitable for covering green manure;

step 2: preparing moss sheets or formulating a coating mixture used for moss growth from the selected moss species and the moss-algae symbiont in combination with other raw materials of the green manure; and step 3: reserving harvesting rows on both sides of a remediation plant, and laying the moss sheets or directly inoculating the coating mixture in a planting area between the harvesting rows.

Preferably, the method further includes: step 4: planting alfalfa and/or Avena nuda in multiple rows or columns at preset distances in the planting area by a planting mechanism; and step 5: performing water supplement and/or fertilizer supplement treatment on the green manure in the planting area by means of a drip irrigation device.

Preferably, each of the moss sheets is configured to include:

a network-shaped first bottom layer;

a base layer and a moss layer that are arranged on the bottom layer; and a network-shaped first surface layer arranged on the moss layer;

wherein the base layer is configured to be prepared by mixing plant fibers, humus soil and/or an oil cake, and electrolytic water, and the moss layer is configured to be prepared by mixing moss, humus soil and/or an oil cake, electrolytic water, paclobutrazol and a growth regulator;

and the first bottom layer and a second surface layer are both configured to be prepared from a degradable material.

Preferably, a planting device is configured to include:

a fixing belt, wherein a plurality of planting boxes with conical structures are distributed at intervals on the fixing belt, and multiple groups of fixing holes are formed in the fixing belt; and U-shaped fasteners matched with the multiple groups of fixing holes;

wherein the alfalfa and/or the Avena nuda is planted in the planting boxes through degradable seedling pots.

Preferably, before and after the moss sheets are laid in the planting area, the moss sheet is fixed by a second bottom layer and the second surface layer that are cooperated with each other, respectively.

Preferably, the second bottom layer and the second surface layer are both structurally configured to include:

grid-shaped laying regions corresponding to laying positions of various moss sheets; and grille-shaped planting regions corresponding to installation positions of various planting devices;

wherein the laying regions are distinguished by different thicknesses or colors to obtain different laying blocks at intervals;

and the interval of grilles in the planting regions is configured to be equal to or greater than the interval of the planting boxes.

Preferably, electrolytic water is sprayed to the planting area by an external spraying device after the moss sheets are laid and the alfalfa and/or the Avena nuda is planted.

The present disclosure at least includes the following beneficial effects. According to the present disclosure, bare soil is covered by arranging cooperative moss-covered green manure in a non-planting area of a remediation plant to ensure the beauty of the appearance. Meanwhile, the soil can also be improved without affecting normal growth of fruit seedlings by further utilizing the advantages of preserving moisture and fertility, improving the nitrogen fixing capacity of the soil and not competing with remediation plants for fertilizer of the moss-covered green manure and by further utilizing ecological functions and effects on vegetation restoration and reconstruction of moss plants. Furthermore, due to light weight load, high water absorption, no fertilizer demand, high drought resistance and low maintenance cost, the moss-covered green manure can be used for realizing greening in the non-planting area all the time to effectively prevent growth of weeds, which is suitable for improvement and fertilization of degraded remediation plants.

In addition, a cooperative effect of the remediation plant and the moss-covered green manure is utilized. The remediation plant can be used in an economic forest to achieve corresponding economic benefits, so that convenience is provided for promotion while soil remediation is realized and economic benefits are improved.

Other advantages, objectives and features of the present disclosure will be partially shown in the following description and will be partially understood by persons skilled in the art through the research and practice of the present disclosure.

DESCRIPTION OF THE EMBODIMENTS

Figure 1:
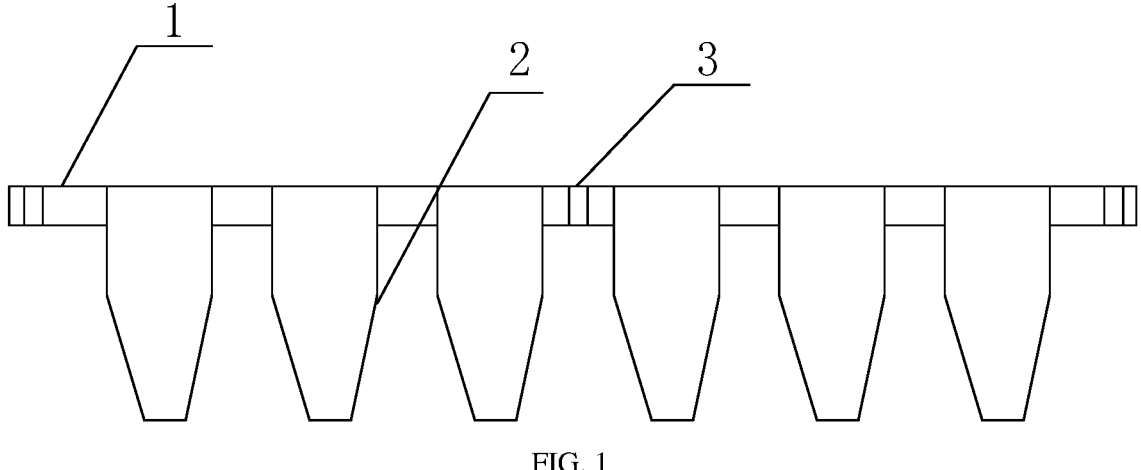
FIG. 1 is a structural schematic diagram of a fixing belt in one embodiment of the present disclosure.

The present disclosure is further described in detail below in conjunction with accompanying drawings, so as to be implemented by persons skilled in the art according to contents of the specification.

It is to be understood that the terms such as "have", "contain" and "include" as used herein are not intended to indicate the presence or addition of one or more other elements or combinations thereof.

Example 1

An application method of moss-covered green manure includes:

step 1: selecting a moss species and a moss-algae symbiont suitable for covering green manure, wherein as mosses have the advantages of not competing with remediation plants for fertilizer, realizing greening and beauty all the time, preserving moisture and fertility, improving the nitrogen fixing capacity of the soil and the like, a moss that can be easily planted artificially, such as *Racomitrium canescens* and *Hypnum cupressiforme*, is used as the moss species in the scheme, a moss-Cyanobacteria symbiont is used as the moss-algae symbiont, and a mixture of mosses, lichens and ferns can also be used certainly;

step 2: preparing moss sheets or formulating a coating mixture used for moss growth from the selected moss species and the moss-algae symbiont in combination with other raw materials of the green manure; and step 3: reserving harvesting rows on both sides of a remediation plant, and laying the moss sheets or directly inoculating the coating mixture in a planting area between the harvesting rows, wherein the moss sheets are laid or the moss is directly inoculated for growth on the ground between rows of the remediation plant, so as to make full use of ecological functions and effects on vegetation restoration and reconstruction of moss plants, so that the moss-covered green manure has the effects of improving fertility and preserving moisture and becomes a potential species having effects of green manure plants; in this scheme, the green manure having potential in ecological remediation of the soil is interplanted with the remediation plant, so that convenience is provided for promotion while soil remediation is realized and economic benefits are improved; and the remediation plant used herein may be a combination of one or more of woody plants (such as planting fruit trees), suffruticosa plants and herbaceous plants.

Each of the moss sheets is configured to include:

a network-shaped first bottom layer;

a base layer and a moss layer that are arranged on the bottom layer; and a network-shaped first surface layer arranged on the moss layer, wherein through the design of the first bottom layer and the first surface layer, the moss sheet has better structural stability and is easy to form and convenient to transport and maintain.

The base layer is configured to be prepared by mixing plant fibers, humus soil and/or an oil cake, and electrolytic water, and the moss layer is configured to be prepared by mixing moss, humus soil and/or an oil cake, electrolytic water, paclobutrazol and a growth regulator. The base layer is used for isolating the soil planting area and the moss layer, preserving moisture and providing nutrients and moisture required for growth of the moss. The moss layer is used for ensuring growth of the moss, and the thickness of the moss layer is usually ⅓ to ½ of that of the base layer.

The first bottom layer and a second surface layer are both configured to be prepared from a degradable material, so that secondary pollution of the soil cannot be caused by using the degradable material.

According to the scheme, by making full use of the advantages of light weight load, high water absorption, no fertilizer demand, high drought resistance and low maintenance cost of the moss better than other higher plants, the moss sheets are designed and laid or the moss is directly inoculated in a non-planting area of the remediation plant to perform moisture and fertility preservation treatment on the soil in the non-planting area, so as to realize soil improvement and prevent soil hardening.

Example 2

Step 1: A moss species and a moss-algae symbiont suitable for covering green manure are selected.

Step 2: Moss sheets are prepared or a coating mixture used for moss growth is formulated from the selected moss species and the moss-algae symbiont in combination with other raw materials of the green manure.

Step 3: Harvesting rows are reserved on both sides of a remediation plant, and the moss sheets are laid or the coating mixture is directly inoculated in a planting area between the harvesting rows.

Step 4: Alfalfa and/or Avena nuda is planted in multiple rows or columns at preset distances in the planting area by a planting mechanism. During actual application, it can be ensured that the alfalfa and/or the Avena nuda has an ornamental value when planted at intervals on a single moss-covered body. Meanwhile, the alfalfa and/or the Avena nuda can be harvested at a predetermined height by cooperative harvesting devices after growth, and the harvested alfalfa and/or the Avena nuda can be broken and used as a raw material for feed and fertilizer. Moreover, based on the complexity of a root system, the root grows to a higher depth to protect the moss layer, so as to prevent the occurrence of a peeling phenomenon of the moss layer caused by external factors in the planting area in a later period. In addition, the forage grass can grow continuously after being harvested and has a low maintenance cost.

Step 5: Water supplement and/or fertilizer supplement treatment is performed on the green manure in the planting area by means of a drip irrigation device. The water supplement and/or fertilizer supplement treatment is performed mainly by spraying, because the moss in the planting area has a shallow root.

Figure 2:
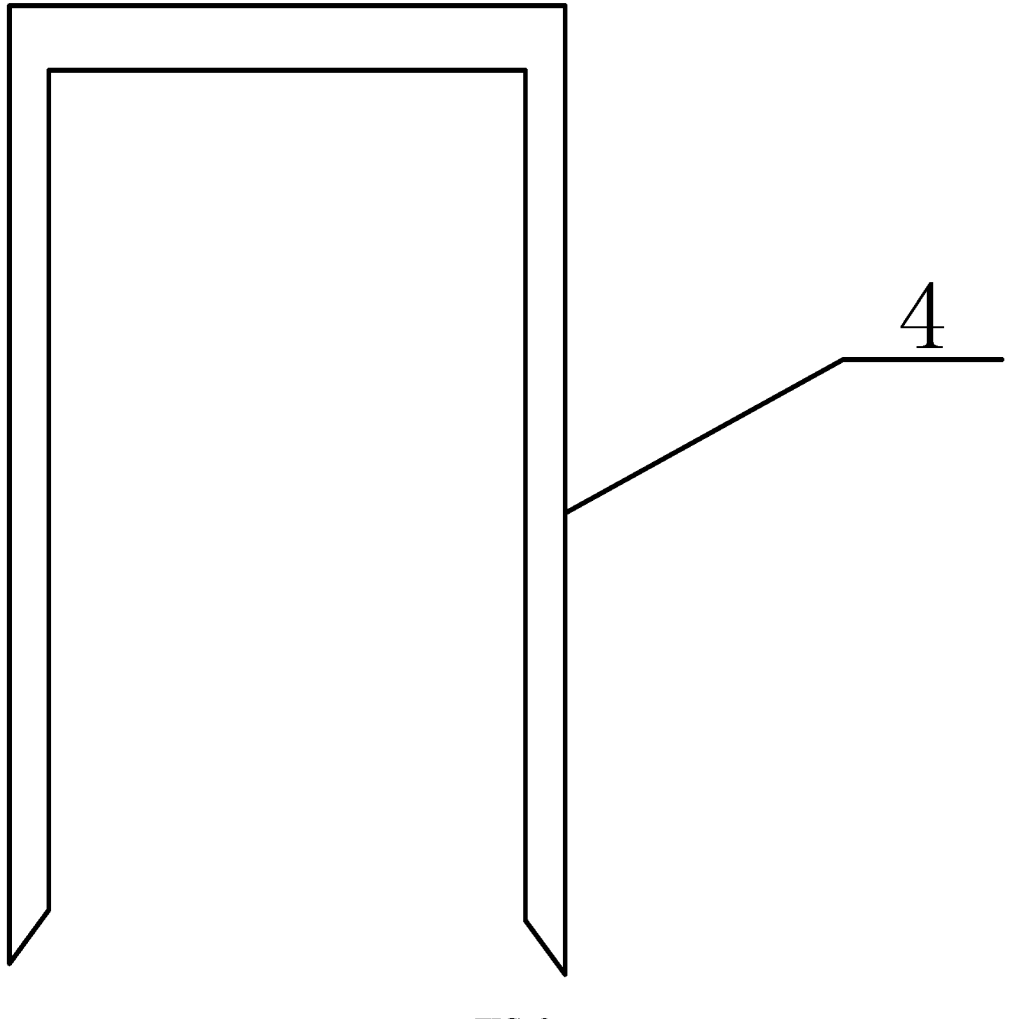
FIG. 2 is a structural schematic diagram of a U-shaped fastener in another embodiment of the present disclosure.
Figure 3:
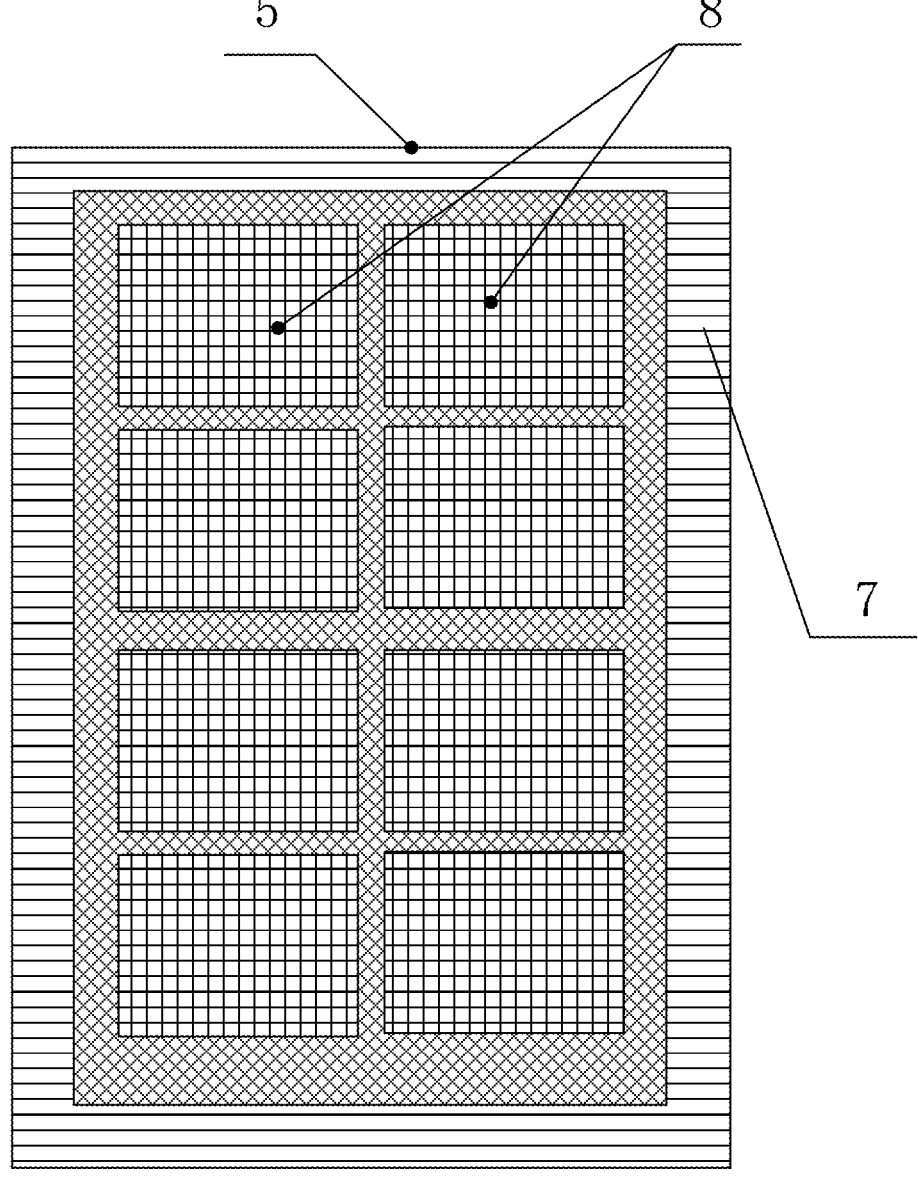
FIG. 3 is a structural schematic diagram of a second bottom layer of the present disclosure.

As shown in FIG. 1 to FIG. 2, a planting device is configured to include:

a fixing belt 1, wherein a plurality of planting boxes 2 with conical structures are distributed at intervals on the fixing belt, and multiple groups of fixing holes 3 are formed in the fixing belt; and U-shaped fasteners 4 matched with the multiple groups of fixing holes.

The alfalfa and/or the Avena nuda is planted in the planting boxes through degradable seedling pots. During practical application, corner positions of a second bottom layer can be fixed by the fasteners after the second bottom layer is laid. Then, corresponding moss sheets are laid in the planting area and fixed through a second surface layer. After the moss sheets are fixed, the planting boxes of the fixing belt are inserted into grille-shaped planting regions, so as to fix the moss sheets located on the second surface layer and the second bottom layer and located between the two layers in the planting area through a horizontal or vertical distribution layout of the fixing belt. After the position of the fixing belt is fixed, the fixing belt is further fixed to the soil through the U-shaped fasteners. After the fixation is completed, the seedling pots with seeds or seedlings are arranged in the planting boxes to complete planting operation.

Example 3

Before and after the moss sheets are laid in the planting area, the moss sheets are fixed by the second bottom layer and the second surface layer that are cooperated with each other, respectively.

The second bottom layer 5 and the second surface layer are both structurally configured to include:

grid-shaped laying regions 7 corresponding to laying positions of various moss sheets; and grille-shaped planting regions 8 corresponding to installation positions of various planting devices.

The laying regions are distinguished by different thicknesses or colors to obtain different laying blocks 8 at intervals. The laying blocks can be arranged in a dimensional layout, such as a combination of any one or more of 10 cm*10 cm, 20 cm*20 cm, 40 cm*40 cm, 60 cm*60 cm, 80 cm*80 cm, 100 cm*100 cm and 100 cm*150 cm, according to actual scene and pattern requirements to achieve better adaptability. The laying blocks can be laid continuously or at intervals to facilitate cutting as required in a later period. Similarly, the second surface layer can also be directly arranged in a grid shape with a small hole size instead of a block structure in the laying regions as required, so as to ensure a fixing effect on the moss sheets in a later period without affecting the appearance of the moss sheets after laying. Further, the second bottom layer and the second surface layer may be prepared from a degradable material as required, so as to facilitate decomposition in a later period and to achieve the effects of protecting and fixing the moss sheets in an early period in a case that a poor binding effect of the moss sheets and the soil is achieved. Meanwhile, through the design of the second bottom layer, modeling of the moss sheets during laying is also facilitated, so that the moss sheets have better artistry after being laid, and requirements of modern agriculture for beauty are met.

The interval of grilles in the planting regions is configured to be equal to or greater than the interval of the planting boxes, so as to achieve better compatibility and convenient installation. Due to such structure, the laid moss sheets are positioned through the second bottom layer and the second surface layer. Meanwhile, the laying regions can provide assistance for laying the moss sheets by block limitation, so that the moss sheets can be laid in a matching manner according to pre-designed sizes and patterns and have better practicality and beauty. Further, the row spacing of the planting regions is better controlled by structural design without affecting installation of planting devices, and simpler operation is achieved.

Example 4

After the moss sheets are laid and the alfalfa and/or the Avena nuda is planted, electrolytic water is sprayed into the planting area by means of an external spraying device. The electrolytic water can be used for promoting growth of the plant and achieving a bacteriostatic effect and an insecticidal effect. Moreover, different types of electrolytic water different in acidity or alkalinity can be selected according to different use stages, and a dust removal effect can also be achieved.

Example 5

A processing flow of moss sheets is configured to include:

S1, laying a first bottom layer and setting a base layer on the first bottom layer by spraying or laying, wherein the base layer is obtained by mixing and blending plant fibers, humus soil and/or an oil cake, and electrolytic water at a ratio of (1.5-2.5):(2-3.5):(0.5-2), meanwhile, the plant fibers can be obtained by crushing plant straw, and the plant straw is required to contain sugar residues or add a certain amount of brown sugar so as to increase the soil stickiness and promote plant growth in a later period;

S2, after the base layer is completely sprayed and air-dried, partially covering the base layer with a first pattern mold, and setting a first moss layer in an uncovered area by spraying or laying;

S3, when the first moss layer stays in a half-dry state, covering the first moss layer with a second pattern mold, and setting a second moss layer in an uncovered area by spraying or laying, wherein mosses of different colors can be used for distinguishing the first moss layer and the second moss layer so as to obtain corresponding patterns after growth, meanwhile, short plants and/or grasses of different colors can also be added in any pattern area so as to achieve different stereoscopic effects after growth in a later period, and various raw materials, including moss, humus soil and/or an oil cake, electrolytic water, paclobutrazol and a growth regulator, in each moss layer are selected at a ratio of (2-2.5):(5-10.5):(0.5-2):(0.05-0.35):(0.05-0.25); and S4, when the second moss layer stays in a half-dry or full-dry state, taking out the second pattern mold, and filling a gap between the first moss layer and the second moss layer with dark humus soil to complete production of the moss sheets.

Example 6

A moss-covered green manure includes the following parts by weight of raw materials: 32 parts of plant fibers, 34 parts of moss, 7 parts of paclobutrazol, 6 parts of a growth regulator, 57 parts of humus soil and/or an oil cake, and 30 parts of electrolytic water. The moss-covered green manure obtained by blending in this scheme has sufficient base fertilizer and a slow release effect, can cooperate with soil having different properties, and can completely meet requirements for root growth of moss. Meanwhile, the electrolytic water can be used for killing bacteria still existing in the soil and promote root growth of plants. Moreover, the formula is simple, conducive to industrial production and better controllable in cost.

The above scheme is only an illustration of a preferred example, but the present disclosure is not limited thereto. Appropriate substitutions and/or modifications may be made according to requirements of users when the present disclosure is implemented.

The number of devices and the processing scale described herein are used to simplify the description of the present disclosure. For persons skilled in the art, applications, modifications and variations of the present disclosure are obvious.

Although the embodiments of the present disclosure are disclosed as above, the present disclosure is not limited to the applications listed in the specification and the embodiments. The present disclosure can be completely applied to various appropriate fields to which the present disclosure belongs. For people familiar with the art, additional modifications can be easily realized. Therefore, without departing from general concepts defined by the claims and the scope of equivalents, the present disclosure is not limited to specific details and the drawings and examples as shown and described herein.

What is claimed is:

1. A moss-covered green manure, comprising the following parts by weight of raw materials: 30-38 parts of plant fibers, 30-35 parts of moss, 3-8 parts of paclobutrazol, 5-7 parts of a growth regulator, 50-62 parts of humus soil and/or an oil cake, and 35-47 parts of electrolytic water.

2. An application method of the moss-covered green manure according to claim 1 in assisting ecological remediation, comprising:

step 1: selecting a moss species and a moss-algae symbiont suitable for covering green manure;

step 2: preparing moss sheets or formulating a coating mixture used for moss growth from the selected moss species and the moss-algae symbiont in combination with other raw materials of the green manure; and step 3: reserving harvesting rows on both sides of a cultivated plant, and laying the moss sheets or directly inoculating the coating mixture in a planting area between the harvesting rows.

3. The application method of the moss-covered green manure in assisting ecological remediation according to claim 2, wherein each of the moss sheets is configured to comprise:

a network-shaped first bottom layer;

a base layer and a moss layer that are arranged on the bottom layer; and a network-shaped first surface layer arranged on the moss layer;

wherein the base layer is configured to be prepared by mixing plant fibers, humus soil and/or an oil cake, and electrolytic water, and the moss layer is configured to be prepared by mixing moss, humus soil and/or an oil cake, electrolytic water, paclobutrazol and a growth regulator;

and the first bottom layer and a second surface layer are both configured to be prepared from a degradable material.

4. The application method of the moss-covered green manure in assistingecological remediation according to claim 3, wherein before and after the moss sheets are laid in the planting area, the moss sheets are fixed by a second bottom layer and the second surface layer that are cooperated with each other, respectively.

5. The application method of the moss-covered green manure in assisting ecological remediation according to claim 4, wherein the second bottom layer and the second surface layer are both structurally configured to comprise:

grid-shaped laying regions corresponding to laying positions of various moss sheets; and grille-shaped planting regions corresponding to installation positions of various planting devices;

wherein the laying regions are distinguished by different thicknesses or colors to obtain different laying blocks at intervals;

and the interval of grilles in the planting regions is configured to be equal to or greater than the interval of the planting boxes.

6. The application method of the moss-covered green manure in assisting ecological remediation according to claim 4, wherein electrolytic water is sprayed to the planting area by an external spraying device after the moss sheets are laid and the alfalfa and/or the Avena nuda is planted.

7. The application method of the moss-covered green manure in assisting ecological remediation according to claim 3, wherein a planting device is configured to comprise:

a fixing belt, wherein a plurality of planting boxes with conical structures are distributed at intervals on the fixing belt, and multiple groups of fixing holes are formed in the fixing belt; and U-shaped fasteners matched with the multiple groups of fixing holes;

wherein the alfalfa and/or the Avena nuda is planted in the planting boxes through degradable seedling pots.

8. The application method of claim 2, further comprising the following parts by weight of functional raw materials: 10-15 parts of alfalfa and/or 20-23 parts of Avena nuda.

9. The application method of claim 8, comprising the following parts by weight of raw materials: 36 parts of plant fibers, 32 parts of moss, 7 parts of paclobutrazol, 6 parts of a growth regulator, 60 parts of humus soil and/or an oil cake, and 38 parts of electrolytic water;

and the following parts by weight of functional raw materials: 13 parts of alfalfa and/or 22 parts of Avena nuda.

10. The application method of the moss-covered green manure in assisting ecological remediation according to claim 2, further comprising: step 4: planting alfalfa and/or Avena nuda in multiple rows or columns at preset distances in the planting area by a planting mechanism; and step 5: performing water supplement and/or fertilizer supplement treatment on the green manure in the planting area by means of a drip irrigation device.

11. The moss-covered green manure according to claim 1, further comprising the following parts by weight of functional raw materials: 10-15 parts of alfalfa and/or 20-23 parts of Avena nuda.

12. The moss-covered green manure according to claim 11, comprising the following parts by weight of raw materials: 36 parts of plant fibers, 32 parts of moss, 7 parts of paclobutrazol, 6 parts of a growth regulator, 60 parts of humus soil and/or an oil cake, and 38 parts of electrolytic water;

and the following parts by weight of functional raw materials: 13 parts of alfalfa and/or 22 parts of Avena nuda.

* * * * *